United States Patent
Dehnke et al.

(10) Patent No.: US 11,991,229 B2
(45) Date of Patent: May 21, 2024

(54) ONBOARD MULTIMEDIA DISTRIBUTION NETWORK FOR AN AIRCRAFT AND METHOD FOR DISTRIBUTING MULTIMEDIA CONTENT ON BOARD OF AN AIRCRAFT

(71) Applicant: Airbus Operations GmbH, Hamburg (DE)

(72) Inventors: Christian Dehnke, Hamburg (DE); Daniel Alexander Kliem, Hamburg (DE); Michael Lüdtke, Hamburg (DE); Christoph Tillack-Nieveler, Hamburg (DE); Carsten Weichbrot, Hamburg (DE); Christian Hertwig, Hamburg (DE); Leo Krüger, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 18/307,235

(22) Filed: Apr. 26, 2023

(65) Prior Publication Data
US 2023/0353618 A1 Nov. 2, 2023

(30) Foreign Application Priority Data
Apr. 28, 2022 (EP) ..................................... 22170635

(51) Int. Cl.
*H04L 65/611* (2022.01)
*H04L 67/12* (2022.01)
(52) U.S. Cl.
CPC ............ *H04L 65/611* (2022.05); *H04L 67/12* (2013.01)
(58) Field of Classification Search
CPC ....... H04L 65/611; H04L 67/12; H04L 69/164
See application file for complete search history.

(56) References Cited

U.S. PATENT DOCUMENTS 7,433,354 B2   10/2008   Scherer et al.
7,869,794 B1 *  1/2011   Weaver ................... H04W 4/14
                                                     455/412.2

(Continued)

FOREIGN PATENT DOCUMENTS

| CN | 112702818 A1 | 4/2021 |
| WO | 2009036391 A2 | 3/2009 |
| WO | 2014024078 A1 | 2/2014 |

OTHER PUBLICATIONS

European Search Report for European Patent Application No. 22170635 dated Sep. 28, 2022; priority document.

*Primary Examiner* — Javier O Guzman
(74) *Attorney, Agent, or Firm* — Greer, Burns & Crain, Ltd.

(57) ABSTRACT

A multimedia distribution network, useful on board a passenger aircraft, includes a first network node configured as a head controller, a plurality of second network nodes configured as intermediate controllers connected to the first network node, and a plurality of third network nodes configured as end device controllers, each connected to one of the second network nodes. The head controller is configured to transmit a multicast stream of multimedia control signal packets to control the end device controllers to the intermediate controllers. The intermediate controllers are configured to periodically transmit unicast delay queries to the head controller, to process the received multimedia control signal packets to the end device controllers and to distribute processed multimedia control signal packets with a controllable delay based on the content of unicast delay indicator signals sent by the head controller to the intermediate controllers in response to the unicast delay queries.

18 Claims, 1 Drawing Sheet

(56) References Cited

U.S. PATENT DOCUMENTS

| | | | |
|---|---|---|---|
| 8,378,595 B2 | 2/2013 | Eckel et al. | |
| 9,538,616 B2 | 1/2017 | Dijk et al. | |
| 10,536,284 B2* | 1/2020 | Li | H04W 84/02 |
| 2006/0198373 A1* | 9/2006 | Hasegawa | H04L 12/1863 |
| | | | 370/432 |
| 2008/0187282 A1* | 8/2008 | Brady | H04L 65/80 |
| | | | 386/E5.07 |
| 2010/0229211 A1* | 9/2010 | Lee | H04N 21/26275 |
| | | | 725/109 |
| 2011/0066746 A1* | 3/2011 | Bennett | H04N 21/44209 |
| | | | 709/236 |
| 2011/0106915 A1* | 5/2011 | Kim | H04N 21/251 |
| | | | 709/219 |
| 2012/0019164 A1 | 1/2012 | Gambeski et al. | |
| 2012/0030717 A1 | 2/2012 | Buga et al. | |
| 2015/0245449 A1 | 8/2015 | Chen et al. | |
| 2015/0257224 A1 | 9/2015 | Timm et al. | |
| 2020/0068226 A1 | 2/2020 | Lüdtke et al. | |
| 2020/0329008 A1* | 10/2020 | Dao | H04L 61/5007 |
| 2021/0116907 A1* | 4/2021 | Altman | B60W 60/0015 |
| 2021/0211156 A1* | 7/2021 | Kessler | H04L 25/4902 |

\* cited by examiner

ONBOARD MULTIMEDIA DISTRIBUTION NETWORK FOR AN AIRCRAFT AND METHOD FOR DISTRIBUTING MULTIMEDIA CONTENT ON BOARD OF AN AIRCRAFT

CROSS-REFERENCES TO RELATED APPLICATIONS

This application claims the benefit of the European patent application No. 22170635.1 filed on Apr. 28, 2022, the entire disclosures of which are incorporated herein by way of reference.

FIELD OF THE INVENTION

The invention relates to a multimedia distribution network, particularly for synchronized distribution of video, audio and/or lighting control data on board of a passenger aircraft. Moreover, the invention relates to a method of distributing multimedia content via a network on board of a passenger aircraft, in particular video, audio and/or lighting control data.

BACKGROUND OF THE INVENTION

The use of light-emitting diodes (LEDs) for interior cabin lighting in the aeronautics field increasingly leads to enhanced passenger experience and improved customer satisfaction. Currently, cabin illumination systems in passenger aircraft utilize or rely on pre-programmed setting of colors and intensity of light for specific flight phases, such as landing or departure as well as times of the day and time zones. Among other benefits, coordinated control of lighting systems may aid passengers in overcoming fatigue of long-distance travel or in keeping calm and relaxed in potentially stressful moments of the flight, such as landing and departure. Moreover, coordination of other multimedia systems on-board an aircraft with the control of the cabin illumination system may further help in creating a believable and satisfying ambience for aircraft passengers.

Decentralized cabin systems require sophisticated approaches in distribution of control data for controlling the various cabin systems in synchronicity. Several approaches have been made but there has not been a comprehensive solution for distributed on-board networks supporting the advantages of decentralized software architectures.

Document US 2012/0019164 A1 discloses a method of operating a lighting fixture in an aircraft. Document WO 2014/024078 A1 discloses a timed lighting control network. Document US 2015/0257224 A1 discloses an LED strip lighting device for a cabin of a passenger aircraft.

Document CN 112702818 A1 discloses flight illumination linkage control methods based on a flight illumination linkage control system, the system comprising a flight information management unit, an illumination control unit and a main control unit.

Document US 2020/0068226 A1 discloses an aircraft cabin management system comprising a video data distributor for distribution of image and video data on-board an aircraft, a central processing unit and at least one graphics processor coupled to the central processing unit.

Document U.S. Pat. No. 8,378,595 B2 indicates an illumination system with an intelligent light module group controller comprising controls for the illumination levels and an interface for receiving and sending information. Document US 2015/0245449 A1 discloses a lighting system and a method for controlling a lighting system, particularly for use in lighting systems of airborne vehicles. Documents US 2021/0211156 A1 and U.S. Pat. No. 7,433,354 A disclose systems for transmitting audio and lighting control data via a communication data bus between multiple devices in an aircraft, and a method for transmitting data packets on a bus system between multiple devices in an aircraft.

SUMMARY OF THE INVENTION

One of the objects of the invention is to find improved solutions for synchronizing the distribution of multimedia content such as video, audio and/or lighting control data within a network of data nodes in a passenger aircraft.

According to a first aspect of the invention, a multimedia distribution network, in particular for use on board of a passenger aircraft, comprises a first network node configured as a head controller, a plurality of second network nodes configured as a plurality of intermediate controllers connected to the first network node, and a plurality of third network nodes configured as a plurality of end device controllers, each connected to one of the plurality of second network nodes. The head controller is configured to transmit a multicast stream of multimedia control signal packets for controlling the plurality of end device controllers to the plurality of intermediate controllers. The plurality of intermediate controllers are configured to periodically transmit unicast delay queries to the head controller, to process the received multimedia control signal packets and to distribute processed multimedia control signal packets to the end device controllers with a controllable delay based on the content of unicast delay indicator signals sent by the head controller to the plurality of intermediate controllers in response to the unicast delay queries.

According to a second aspect of the invention, a method of distributing multimedia content via a decentralized network on board of a passenger aircraft includes the steps of transmitting, by a first network node of the decentralized network configured as a head controller, a multicast stream of multimedia control signal packets for controlling a plurality of third network nodes of the decentralized network configured as a plurality of end device controllers; receiving, by a plurality of second network nodes of the decentralized network configured as a plurality of intermediate controllers, the a multicast stream from the head controller; periodically transmitting, by the plurality of intermediate controllers, unicast delay queries to the head controller; receiving, by the plurality of intermediate controllers, unicast delay indicator signals sent by the head controller to the plurality of intermediate controllers in response to the unicast delay queries; and processing, by the plurality of intermediate controllers, the received multimedia control signal packets to the end device controllers and distributing processed multimedia control signal packets with a controllable delay based on the content of the received unicast delay indicator signals.

According to a third aspect of the invention, an aircraft, in particular a passenger aircraft, comprises a multimedia distribution network according to the first aspect of the invention. In some embodiments, the aircraft may further comprise cabin lighting units controlled by lighting control data distributed via the multimedia distribution network.

A particular advantage of the solutions according to the invention is that some control settings may be pre-loaded in network nodes lower down in the control hierarchy which may aid in keeping synchronicity of executing multimedia control commands to an improved degree. Moreover, this pre-loading enhances flexibility and intelligence in end devices at the outer edges of any kind of network which advantageously aids in increasing reliability of control in the overall system.

By creating a distributed network topology of more granular hierarchy steps, the network is highly scalable. The standardized network control policies further enable interchangeability of single network nodes without the need for re-designing the network entirely. Standardizing the distribution of partial settings over multiple network nodes in different hierarchy levels in a network will guarantee high real-time capabilities as well as simplified pre-deployment procedures, specifically in retrofit scenarios.

According to some embodiments of the multimedia distribution network and/or the method of distributing multimedia content, the multimedia control signal packets may indicate audio data content, video data content and/or lighting control data content to be processed by the intermediate controllers. Specifically with regard to central lighting control applications in a cabin management system, the solution for disseminating multimedia control signal packets is advantageous as a central controller may coherently orchestrate pre-defined lighting scenes or effects. The cabin management system may select the pre-defined lighting scenes or effects and pass parameters to the head controller which in turn selects a number of required intermediate controllers connected to the correct lighting units within the cabin. The intermediate controllers are provided with commands to execute the requested scenes or effects. The packets with lighting control data content are locally synchronized within the intermediate controllers with the aid of the unicast delay querying procedure of the second aspect of the invention so that each of the intermediate controllers may execute the correct part of a scene or effect within the correct timing.

According to some embodiments of the multimedia distribution network, a plurality of end devices may be connected to the plurality of end device controllers. In several of those embodiments, the plurality of end device controllers may be configured to control the plurality of end devices on the basis of the audio data content, video data content and/or lighting control data content indicated in the multimedia control signal packets. The end devices may in some cases be included in end device modules, such as lighting modules, which also include one of the end device controllers.

In some embodiments, the multimedia distribution network may further include a plurality of end device interpreters connected between respective ones of the plurality of intermediate controllers and the plurality of end device controllers. In several of those embodiments, the plurality of end device interpreters may be configured to convert the content of the multimedia control signal packets into control signals specific to the plurality of end devices. The end device interpreters may advantageously be used for protocol conversion between the communication protocol used in the multimedia distribution network and the "last mile" of command communication within an end device module, such as a lighting module. This enables retrofit solutions with existing end device modules in an aircraft cabin as well as easy and quick integration and/or replacement of end device modules of various origins.

According to some further embodiments of the multimedia distribution network, the plurality of end device interpreters may be configured to transmit feedback information regarding operation status and/or debug information of the plurality of end device controllers to the respectively connected one of the plurality of intermediate controllers. This advantageously allows for feedback regarding certain information collected within end device modules, such as for example periodic heartbeat information to indicate error-free operation, data indicating the configuration of the end device, debug information or sensor values gathered within the end device module.

According to some further embodiments of the multimedia distribution network, the head controller may be configured to transmit the multicast stream with a configurable delay between subsequent multimedia control signal packets.

According to some further embodiments of the multimedia distribution network, the plurality of intermediate controllers may be configured to distribute the received multimedia control signal packets to the end device controllers in a multicast stream of end device control signal packets. In several of those embodiments, the multicast stream of end device control signal packets may be an IP multicast with to the User Datagram Protocol (UDP) as transport protocol.

According to some further embodiments of the multimedia distribution network, the multicast stream of multimedia control signal packets may be an IP multicast with to the User Datagram Protocol (UDP) as transport protocol.

According to some embodiments of the method, transmitting the multicast stream of multimedia control signal packets may be performed with a configurable delay between subsequent multimedia control signal packets.

According to some further embodiments of the method, distributing the received multimedia control signal packets to the end device controllers may be performed using a multicast stream of end device control signal packets.

The above configurations and refinements may be combined with one another as desired where expedient. Further possible embodiments, refinements and implementations of the invention also encompass combinations, which are not explicitly mentioned, of features of the invention described above or below with regard to the exemplary embodiments. In particular, a person skilled in the art will also add individual aspects as improvements or additions to the respective basic form of the present invention.

BRIEF DESCRIPTION OF THE DRAWINGS

The present invention will be discussed in more detail below on the basis of the exemplary embodiments shown in the schematic figures. In the figures.

Figure 1:
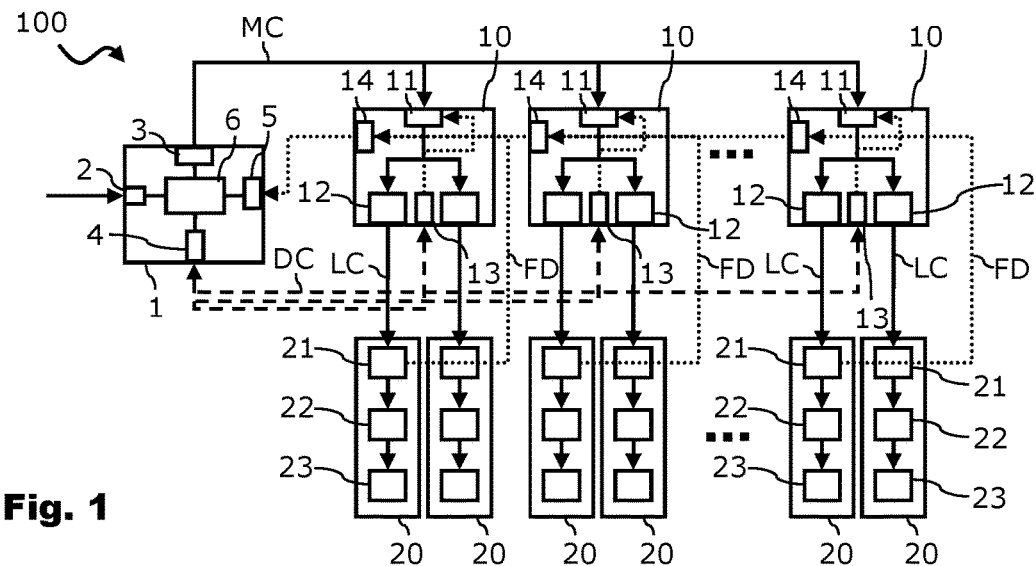
FIG. 1 shows a schematic diagram of a multimedia distribution network for use on-board of a passenger aircraft according to one embodiment of the invention.

The appended figures are intended to provide improved understanding of the embodiments of the invention. They illustrate embodiments and serve, in conjunction with the description, for the explanation of principles and concepts of the invention. Other embodiments, and many of the stated advantages, will emerge with regard to the drawings. The elements of the drawings are not necessarily shown true to scale relative to one another. Direction-indicating terminology such as, for instance, "top", "bottom", "left", "right", "above", "below", "horizontal", "vertical", "front", "rear" and similar indications are used only for explanatory purposes and do not serve to restrict the generality to specific configurations as shown in the figures.

In the figures of the drawing, elements, features and components which are identical, functionally identical and of identical action are denoted in each case by the same reference designations unless stated otherwise.

DETAILED DESCRIPTION OF THE PREFERRED EMBODIMENTS

Multicast messaging in the context of this invention comprises any form of one-to-many communication between nodes in a network where datagrams, such as data packets or data frames, are addressed for or directed to a particular group of network nodes subscribed to the multicast service, the so-called multicast group. Members of that group may receive and process any multicast messaging content sent by a specific multicast messaging transmitter within the network. The multicast messaging transmitter will send only one copy/version of the content to be distributed which will be delivered to a plurality of network nodes in the multicast group. Association with a multicast group and labelling of the multicast messages may be affected by means of protocol-specific multicast addresses, such as for example IP addresses. Multicast messaging in the context of this invention may particularly include network-assisted multicasting where copies of multicast messages are automatically created in network segments including multicast group members.

Unicast messaging in the context of this invention comprises any form of one-to-one communication between nodes in a network where datagrams, such as data packets or data frames, are transmitted from one node in the network to another predetermined destination node in the network. Both transmitting and destination network node are identified by an unambiguous network address such as an IP address. Unicast messaging in the context of this invention may be unidirectional or bidirectional.

Datagrams within the context of this invention comprise any type of data transfer unit in a packet-switched network for communication data content without the need for a connection. Datagrams may include a payload section preceded by an administrative header section. Datagrams in the context of this invention may in particular be data packets or data frames, and underlying communication protocols relying on such datagrams may be Ethernet, IP, UDP or TCP.

Transmission of certain commands and/or control signals within the context of this disclosure may be performed under a lightweight messaging protocol for machine-to-machine (M2M) communication, such as the Message Queuing Telemetry Transport (MQTT) protocol. Advantages of using MQTT for transmission of certain commands and/or control signals between participants in a multimedia distribution network are its easy manageable footprint of code and the concomitant low requirements with respect to bandwidth resources and reliability measures of the underlying network. MQTT is based on TCP/IP establishing a connection between server type network nodes (brokers) and other network nodes participating in the communication under MQTT (clients). The brokers act as intermediaries for any communication with the clients and any communication of the clients among each other. Clients may either publish content, i.e., sending out blocks of data with payload content associated with a predefined topic, or subscribe to a certain topic, i.e., querying with the broker for blocks of data published by other clients labelled with the desired topic indicator. Topics may be branched into subtopics. Due to MQTT communication being driven by events (actual subscription queries triggering multicasting of corresponding published data), the bandwidth requirements are kept low since data transmission is not performed continuously or periodically in line with a predefined transmission schedule.

The User Datagram Protocol (UDP) is established on the transport layer and is part of the Internet Protocol (IP) suite, thus coined as UDP/IP. UDP does not require pre-existent connections prior to any data transmission and is therefore inherently unreliable. However, in UDP transmission, packets may be dropped without the need to wait for or to re-transmit delayed packets. Real-time dissemination of data under UDP is highly efficient both in terms of bandwidth requirements as well as latency, specifically for multimedia distribution networks.

Figure 5:
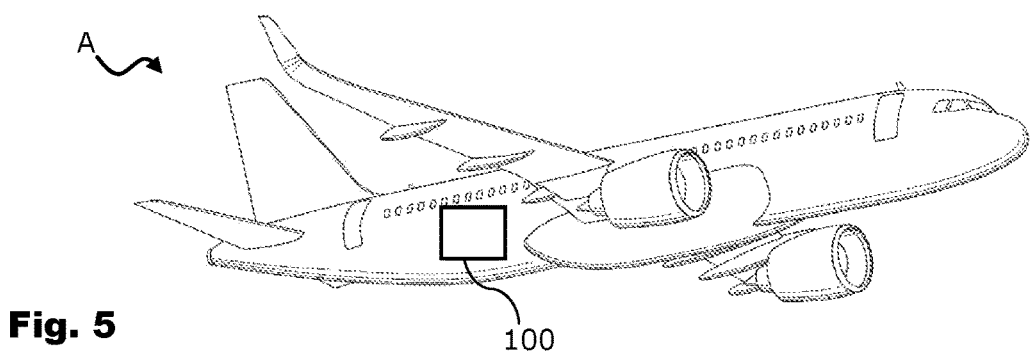
FIG. 5 shows an aircraft having a multimedia distribution network according to a further embodiment of the invention.

FIG. 1 shows a schematic diagram of a multimedia distribution network 100 for use on-board of a passenger aircraft, such as, for example, the passenger aircraft A depicted in conjunction with FIG. 5. The network 100 includes a number of network nodes which are interconnected among each other. By way of non-limiting example, a first network node acts as a head controller 1. A number of second network nodes connected to the first network node act as a plurality of intermediate controllers 10. In the depicted configuration, the multimedia distribution network 100 is implemented as a star topology, however, other forms of network topologies are equally possible, such as daisy-chain topologies, cluster topologies, ring topologies, partially or fully connected mesh topologies or any sort of hybrid network topologies as combination of two or more of the aforementioned topology types. For example, the multimedia distribution network 100 may be arranged in a star-ring network, a snowflake network or a cluster-mesh network.

The first and second network nodes may be functionally equipped with the necessary elements and features to dynamically take on either the role of a head controller 1 or of one of the intermediate controllers 10. In one form of implementation, the role of a head controller 1 is predetermined, however, in other forms the role of the head controller 1 may dynamically be re-assigned to a different one of the second network nodes, for example in order to provide functional redundancy in case of permanent or temporary failure or unavailability of the respective first network node acting as head controller 1 previously.

Connected to a respective one of the intermediate controllers 10 there is a plurality of third network nodes configured as a plurality of end device controllers 22. The end device controllers 22 may be internal processors of end device modules 20. The end device modules 20 may further include functional units 23 that are controlled by the respective end device controller 22, such as for example lighting units, loudspeakers, displays or other multimedia end devices.

The head controller 1 is configured to transmit a multicast stream MC of multimedia control signal packets for controlling the plurality of end device controllers 22 to the plurality of intermediate controllers 10. To that end, the head controller 1 may include a central processor 6 that controls various communication interfaces 2, 3, 4 and 5. A cabin communication interface 2 may receive control data from a cabin management system (not shown) of the aircraft which the multimedia distribution network 100 is part of, for example via MQTT. This control data includes commands and parameters to select a pre-defined multimedia scenario for display by a number of end devices 23.

The multicast stream MC may, for example, be disseminated to a number of selected or subscribed intermediate controllers 10 via a multicast output 3 of the head controller 1 to multicast inputs 11 of the intermediate controllers 10. The multicast stream MC may include a stream of multimedia control signal packets indicating audio data content, video data content and/or lighting control data content to be processed by the intermediate controllers. The payload content of the multimedia control signal packets is determined to reach a number of end device controllers 22 which in turn are configured to control the plurality of end devices 23 on the basis of the payload content included in processed multimedia control signal packets processed by the intermediate controllers according to the indicated content of the original multimedia control signal packets.

Figure 2:
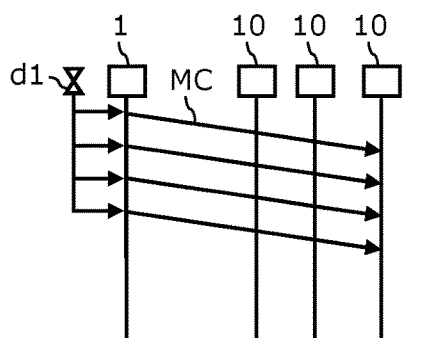
FIG. 2 shows an example for a messaging sequencing chart in multicast messaging between a head controller and a number of intermediate controllers for content distribution in the multimedia distribution network of FIG. 1.

As exemplarily depicted in the message sequence chart of FIG. 2, the head controller 1 is configured to transmit the multicast stream MC with a configurable multicast delay d1 between subsequent multimedia control signal packets. The multicast stream MC of multimedia control signal packets may in some cases be an IP multicast with the User Datagram Protocol (UDP) as transport protocol.

In some cases, the end device modules 20 may include an end device interpreter 21 each of which is connected between respective ones of the intermediate controllers 10 and the end device controllers 22. Those end device interpreters 21 are used to convert the payload content of the multimedia control signal packets into control signals specific to the respectively associated end devices 23, for example audio control signals for loudspeakers, video control commands for displays or lighting control signals for lighting units such as LED strips or panels. The end device interpreters 21 may in some forms of implementation be configured to transmit feedback information FD regarding operation status and/or debug information of the plurality of end device controllers 22 to the respectively connected one of the plurality of intermediate controllers 10, for example via a route through a feedback interface 14 of the corresponding intermediate controller 10 to a debug interface 5 of the head controller 1. The feedback information FD may be used to fine-tune the performance of the end devices 23 or by re-arranging the selection of the end devices 23 by the head controller 1 in order to achieve the desired output of the pre-defined multimedia scenario.

The intermediate controllers 10 may include control interfaces 12 used to distribute the received multimedia control signal packets to the end device controllers 22, optionally supported by the end device interpreters 21. In order to provide for synchronicity of the distribution of the multimedia control signal packets to the various end devices modules 20 across the host of intermediate controllers 10, each intermediate controller 10 includes a query interface 13 over which the intermediate controller 10 may periodically transmit unicast delay queries DC to the head controller 1.

Figure 3:
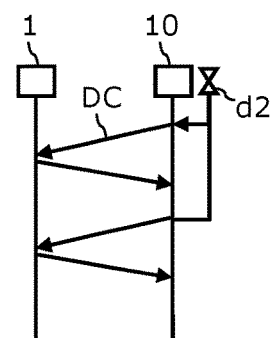
FIG. 3 shows an example for a messaging sequencing chart in unicast messaging between a head controller and an exemplary intermediate controller for delay polling in the multimedia distribution network of FIG. 1.
Figure 4:
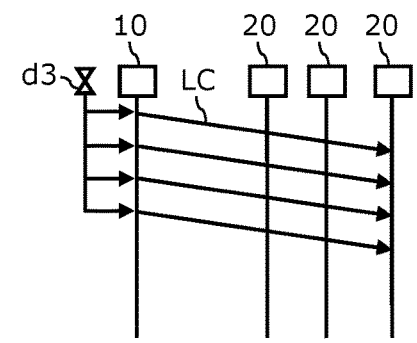
FIG. 4 shows an example for a messaging sequencing chart in multicast messaging between an intermediate controller and a number of end device controllers for content distribution in the multimedia distribution network of FIG. 1.

As exemplarily illustrated in the message sequence chart of FIG. 3, the head controller 1 receives a unicast delay query DC at the query interface 4 and immediately returns a timestamped unicast delay indicator signal back to the querying intermediate controller 10. The round-trip time (RTT) of the unicast delay query DC and the corresponding unicast delay indicator signal is evaluated by the intermediate controller 10 so that the distribution of the received multimedia control signal packets to the end device controllers 22 may be performed with a controllable delay based on the evaluated RTT. As illustrated in the message sequence chart of FIG. 4, the received multimedia control signal packets may in some cases be distributed using a multicast stream LC of end device control signal packets which in some forms of implementation be an IP multicast with the User Datagram Protocol (UDP). The controllable delay d3 may then be set by the intermediate controllers 10 to improve synchronicity of the decentralized multicast streams LC from different intermediate controllers 10.

One application scenario for the multimedia distribution network 100 is an overall system architecture envisioned for the lighting units and panels in passenger cabin of a passenger aircraft, such as for example the aircraft A of FIG. 5. The head controller 1 acts as a central light controller receiving lighting scenario commands via MQTT from the cabin management system. These commands select a pre-defined scene or effect and pass some parameters to the head controller 1. The head controller 1 then selects the required intermediate controllers 10 within the aircraft cabin and commands those to execute the requested scene. Beforehand, the intermediate controllers 10 are programmed with the necessary settings needed to know how a certain scene or effect should be executed. The packets send from the head controller 1 to the intermediate controllers 10 also synchronize the state of the intermediate controllers 10, so that each of the intermediate controllers 10 executes the right part of a scene or effect at the right time. Dynamically adjusting the delays for each of the intermediate controllers 10 on the basis of the delay polling with the head controller 1 greatly aids in achieving that level of synchronicity.

Packets generated by the intermediate controllers 10 command the associated end devices 23, for example lighting units and/or LED panels or strips, to display certain colors, hues, brightness etc. Additionally, each end devices 23 may provide certain feedback information FD to the associated intermediate controller 10 via MQTT. All or most of this feedback information FD is then passed to the head controller 1 by the intermediate controllers 10 for further evaluation and action.

The unicast delay querying procedure initiated by the intermediate controllers 10 from time to time with a delay d2 provides the intermediate controllers 10 with information about the network delay that the received multimedia control signal packets experience when received from the head controller 1.

Figure 6:
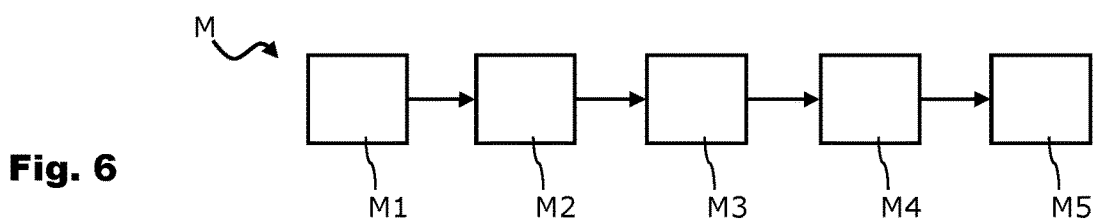
FIG. 6 shows a flowchart of a method of distributing multimedia content via a network on board of a passenger aircraft, for example the multimedia distribution network as shown in FIG. 1, according to a further embodiment of the invention.

FIG. 6 shows a flowchart of the method steps of a method M of distributing multimedia content via a network on board of a passenger aircraft, for example the multimedia distribution network 100 as shown in FIG. 1. The method M may advantageously be carried out on-board of a passenger aircraft, such as the aircraft A as exemplarily depicted in FIG. 5. Specifically, the method M may be used to disseminate lighting control among lighting modules distributed and installed in various places of a passenger cabin within the passenger aircraft A.

In a first step M1, a head controller 1 which is selected as a first network node from a multiplicity of nodes in the multimedia distribution network 100 transmits a multicast stream MC of multimedia control signal packets to other nodes in the multimedia distribution network 100 selected and configured as intermediate controllers 10. The multimedia control signal packets are intended to control nodes in the multimedia distribution network 100 which are configured as end device controllers 22. Specifically, the multimedia control signal packets may indicate audio data content, video data content and/or lighting control data content, i.e., payload with respect to audio data, video data and/or commands for controlling lighting units. In some cases, the head controller 1 introduces a configurable delay d1 between subsequent multimedia control signal packets during transmission of the multicast stream MC.

In a second step M2, the intermediate controllers 10 receive the multicast stream MC from the head controller 1. The multicast stream MC may for example be an IP multicast with the User Datagram Protocol (UDP) as transport protocol. Upon receipt of the multicast stream MC, the receiving intermediate controllers 10 periodically transmit unicast delay queries DC to the head controller 1 in a third step M3. The unicast delay queries DC elicit responses by the head controller 1 which in turn sends out unicast delay indicator signals targeted to the specific intermediate controllers 10 from where the unicast delay queries DC had been obtained. The unicast delay indicator signals are received in a fourth step M4 by the querying intermediate controllers 10.

The unicast delay indicator signals enable the receiving intermediate controllers 10 to measure the delay a received multimedia control signal packet of the multicast stream MC is subject to when transmitted from the head controller 1 to the respective intermediate controller 10. The timestamps of the unicast delay queries DC and the unicast delay indicator signals may be evaluated by the intermediate controllers 10 to estimate the difference between the clocks in the head controller 1 and the intermediate controller 10. The intermediate controllers 10 may further measure the time it took to receive the unicast delay indicator signal in response to the unicast delay query DC. For example, assuming equal network load in upstream (towards the head controller 1) and downstream (towards the intermediate controller 10), half of the measured Round-Trip-Time (RTT) for one unicast delay querying cycle can be determined as the packet delay time. Subsequent packet delay times may be measured and subject to a moving window averaging procedure in order to smoothen out the measured delay times when there are high fluctuations in the measurements.

The intermediate controllers 10 then process the received multimedia control signal packets and distribute the processed multimedia control signal packets to the end device controllers 22 in a fifth step M5. The distribution may be performed using a multicast stream LC of end device control signal packets. The intermediate controllers 10 use the currently determined packet delay times from the last unicast delay querying cycle(s) to set a controllable delay of the end device control signal packets. That way, synchronicity between the end device controllers 22 may be established based on the content of the received unicast delay indicator signals for each of the intermediate controllers 10 individually.

In order to improve the stringency of the representation, various features were combined in one or more examples in the detailed description above. However, it should be clear in this case that the description above is only of an illustrative and in no way restrictive nature. It is used to cover all alternatives, modifications and equivalents of the various features and exemplary embodiments. Many other examples will be immediately and directly clear to a person skilled in the art on the basis of his technical knowledge in view of the description above.

The exemplary embodiments were chosen and described in order to be able to represent the principles on which the invention is based and their possible uses in practice in the best possible manner. As a result, experts can optimally modify and use the invention and its various exemplary embodiments for the intended purpose. In the claims and the description, the terms "containing" and "having" are used as neutral concepts for the corresponding term "comprising". Furthermore, a use of the terms "a", "an" and "one" is not intended to fundamentally exclude a plurality of features and components described in such a way.

The systems and devices described herein may include a controller, a head controller 1, an intermediate controller 10, an end device controller 22, a control unit, a system control or a computing device comprising a processing unit and a memory which has stored therein computer-executable instructions for implementing the processes described herein. The processing unit may comprise any suitable devices configured to cause a series of steps to be performed so as to implement the method such that instructions, when executed by the computing device or other programmable apparatus, may cause the functions/acts/steps specified in the methods described herein to be executed. The processing unit may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory may be any suitable known or other machine-readable storage medium. The memory may comprise non-transitory computer readable storage medium such as, for example, but not limited to, an electronic, magnetic, optical, electromagnetic, infrared, or semiconductor system, apparatus, or device, or any suitable combination of the foregoing. The memory may include a suitable combination of any type of computer memory that is located either internally or externally to the device such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. The memory may comprise any storage means (e.g., devices) suitable for retrievably storing the computer-executable instructions executable by processing unit.

The methods and systems described herein may be implemented in a high-level procedural or object-oriented programming or scripting language, or a combination thereof, to communicate with or assist in the operation of the controller or computing device. Alternatively, the methods and systems described herein may be implemented in assembly or machine language. The language may be a compiled or interpreted language. Program code for implementing the methods and systems for detecting skew in a wing slat of an aircraft described herein may be stored on the storage media or the device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein.

Computer-executable instructions may be in many forms, including program modules, executed by one or more computers or other devices. Generally, program modules include routines, programs, objects, components, data structures, etc., that perform particular tasks or implement particular abstract data types. Typically, the functionality of the program modules may be combined or distributed as desired in various embodiments.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A multimedia distribution network, the network comprising:
   a first network node configured as a head controller;
   a plurality of second network nodes configured as a plurality of intermediate controllers connected to the first network node;
   a plurality of third network nodes configured as a plurality of end device controllers, each connected to one of the plurality of second network nodes,
      the head controller being further configured to transmit a multicast stream of multimedia control signal packets for controlling the plurality of end device controllers to the plurality of intermediate controllers, and
      the plurality of intermediate controllers being further configured to periodically transmit unicast delay queries to the head controller, to process received multimedia control signal packets and to distribute processed multimedia control signal packets to the end device controllers with a controllable delay based on content of timestamped unicast delay indicator signals sent by the head controller to the plurality of intermediate controllers in response to the unicast delay queries,
      wherein the head controller receives the unicast delay queries and immediately returns the timestamped unicast delay indicator signals back to the querying intermediate controller.

2. The multimedia distribution network according to claim 1, wherein the multimedia control signal packets indicate at least one of audio data content, video data content or lighting control data content to be processed by the intermediate controllers.

3. The multimedia distribution network according to claim 2, further comprising a plurality of end devices connected to the plurality of end device controllers, the plurality of end device controllers being configured to control the plurality of end devices based on the at least one of audio data content, video data content or lighting control data content indicated in the multimedia control signal packets.

4. The multimedia distribution network according to claim 3, further including a plurality of end device interpreters connected between respective ones of the plurality of intermediate controllers and the plurality of end device controllers, the plurality of end device interpreters being configured to convert the content of the multimedia control signal packets into control signals specific to the plurality of end devices.

5. The multimedia distribution network according to claim 4, wherein the plurality of end device interpreters is configured to at least one of transmit feedback information regarding operation status or debug information of the plurality of end device controllers to the respectively connected one of the plurality of intermediate controllers.

6. The multimedia distribution network according to claim 1, wherein the head controller is configured to transmit the multicast stream with a configurable multicast delay between subsequent multimedia control signal packets.

7. The multimedia distribution network according to claim 1, wherein the plurality of intermediate controllers are configured to distribute the received multimedia control signal packets to the end device controllers in a multicast stream of end device control signal packets.

8. The multimedia distribution network according to claim 7, wherein the multicast stream of end device control signal packets is an IP multicast with a User Datagram Protocol as transport protocol.

9. The multimedia distribution network according to claim 1, wherein the multicast stream of multimedia control signal packets is an IP multicast with a User Datagram Protocol as transport protocol.

10. The multimedia distribution network according to claim 1, wherein the network is located on board of a passenger aircraft.

11. A method for distributing multimedia content in a decentralized network, the method comprising:
    transmitting, by a first network node of the decentralized network configured as a head controller, a multicast stream of multimedia control signal packets for controlling a plurality of third network nodes of the decentralized network configured as a plurality of end device controllers;
    receiving, by a plurality of second network nodes of the decentralized network configured as a plurality of intermediate controllers, the multicast stream from the head controller;
    periodically transmitting, by the plurality of intermediate controllers, unicast delay queries to the head controller;
    receiving, by the head controller, the unicast delay queries;
    timestamping, by the head controller, the unicast delay indicator signal;
    receiving, by the plurality of intermediate controllers, timestamped unicast delay indicator signals sent by the head controller to the plurality of intermediate controllers in response to the unicast delay queries; and
    processing, by the plurality of intermediate controllers, received multimedia control signal packets and distributing processed multimedia control signal packets to the end device controllers with a controllable delay based on a content of received unicast delay indicator signals.

12. The method according to claim 11, wherein the multimedia control signal packets indicate at least one of audio data content, video data content or lighting control data content to be processed by the intermediate controllers.

13. The method according to claim 11, wherein transmitting the multicast stream of multimedia control signal packets is performed with a configurable delay between subsequent multimedia control signal packets.

14. The method according to claim 11, wherein distributing the received multimedia control signal packets to the end device controllers is performed using a multicast stream of end device control signal packets.

15. The method according to claim 11, wherein the method is performed on board of a passenger aircraft.

16. An aircraft including a multimedia distribution network according to claim 1.

17. The multimedia distribution network according to claim 1, wherein the unicast delay queries are received by a query interface of the head controller.

18. The method according to claim 11, wherein the unicast delay queries are received by a query interface of the head controller.

* * * * *